United States Patent
Agiwal et al.

(10) Patent No.: US 10,390,267 B2
(45) Date of Patent: Aug. 20, 2019

(54) METHOD AND SYSTEM FOR HANDLING DEVICE TO DEVICE (D2D) COMMUNICATION

(71) Applicant: Samsung Electronics Co., Ltd., Suwon-si, Gyeonggi-do (KR)

(72) Inventors: Anil Agiwal, Suwon-si (KR); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 14/886,665

(22) Filed: Oct. 19, 2015

(65) Prior Publication Data

US 2016/0112910 A1  Apr. 21, 2016

(30) Foreign Application Priority Data

Oct. 17, 2014 (IN) ............................ 5200/CHE/2014
Jul. 2, 2015 (IN) ............................ 5200/CHE/2014

(51) Int. Cl.
*H04W 36/00* (2009.01)
*H04W 76/14* (2018.01)
*H04W 72/04* (2009.01)

(52) U.S. Cl.
CPC ....... *H04W 36/0094* (2013.01); *H04W 72/04* (2013.01); *H04W 76/14* (2018.02); *H04W 36/03* (2018.08)

(58) Field of Classification Search
None
See application file for complete search history.

(56) References Cited

U.S. PATENT DOCUMENTS

| | | | |
|---|---|---|---|
| 2003/0109270 A1* | 6/2003 | Shorty | H04L 12/2803 455/517 |
| 2010/0101692 A1 | 4/2010 | Fogal, Sr. et al. | |
| 2013/0150061 A1 | 6/2013 | Shin et al. | |
| 2014/0023008 A1 | 1/2014 | Ahn et al. | |
| 2014/0064203 A1* | 3/2014 | Seo | H04W 28/06 370/329 |
| 2014/0204847 A1* | 7/2014 | Belleschi | H04W 76/023 370/329 |

(Continued)

FOREIGN PATENT DOCUMENTS

| | | |
|---|---|---|
| KR | 10-2013-0065373 A | 6/2013 |
| WO | 2010-049801 A1 | 5/2010 |

(Continued)

*Primary Examiner* — Adnan Baig
(74) *Attorney, Agent, or Firm* — Jefferson IP Law, LLP

(57) ABSTRACT

A system and a method for a base station to reduce signaling overhead in device-to-device (D2D) communication are provided. The method includes a list of one or more destination identities (IDs) in a signaling message from at least one of UE and source base station, receiving a destination index in a buffer status report (BSR) from UE to request dedicated resources for transmitting D2D communication packets to a destination, determining the destination ID corresponding to destination index received in the BSR using the list of one or more destination IDs received from at least one of UE and source base station wherein the destination index is the index of destination ID in the list of destination IDs received, and allocating resources to the UE based on the determined destination ID.

12 Claims, 8 Drawing Sheets

(56) References Cited

U.S. PATENT DOCUMENTS

| | | | |
|---|---|---|---|
| 2014/0219095 A1* | 8/2014 | Lim | H04W 72/085 |
| | | | 370/235 |
| 2015/0163689 A1 | 6/2015 | Lee et al. | |
| 2016/0050558 A1* | 2/2016 | Wallentin | H04W 8/005 |
| | | | 370/329 |
| 2016/0112910 A1* | 4/2016 | Agiwal | H04W 72/04 |
| | | | 370/331 |
| 2016/0174194 A1* | 6/2016 | Suzuki | H04W 76/14 |
| | | | 370/312 |
| 2016/0183239 A1* | 6/2016 | Lee | H04W 56/0015 |
| | | | 370/329 |
| 2017/0171837 A1* | 6/2017 | Chen | H04W 72/04 |

FOREIGN PATENT DOCUMENTS

| | | |
|---|---|---|
| WO | 2012-091420 A2 | 7/2012 |
| WO | 2013-191353 A1 | 12/2013 |

* cited by examiner

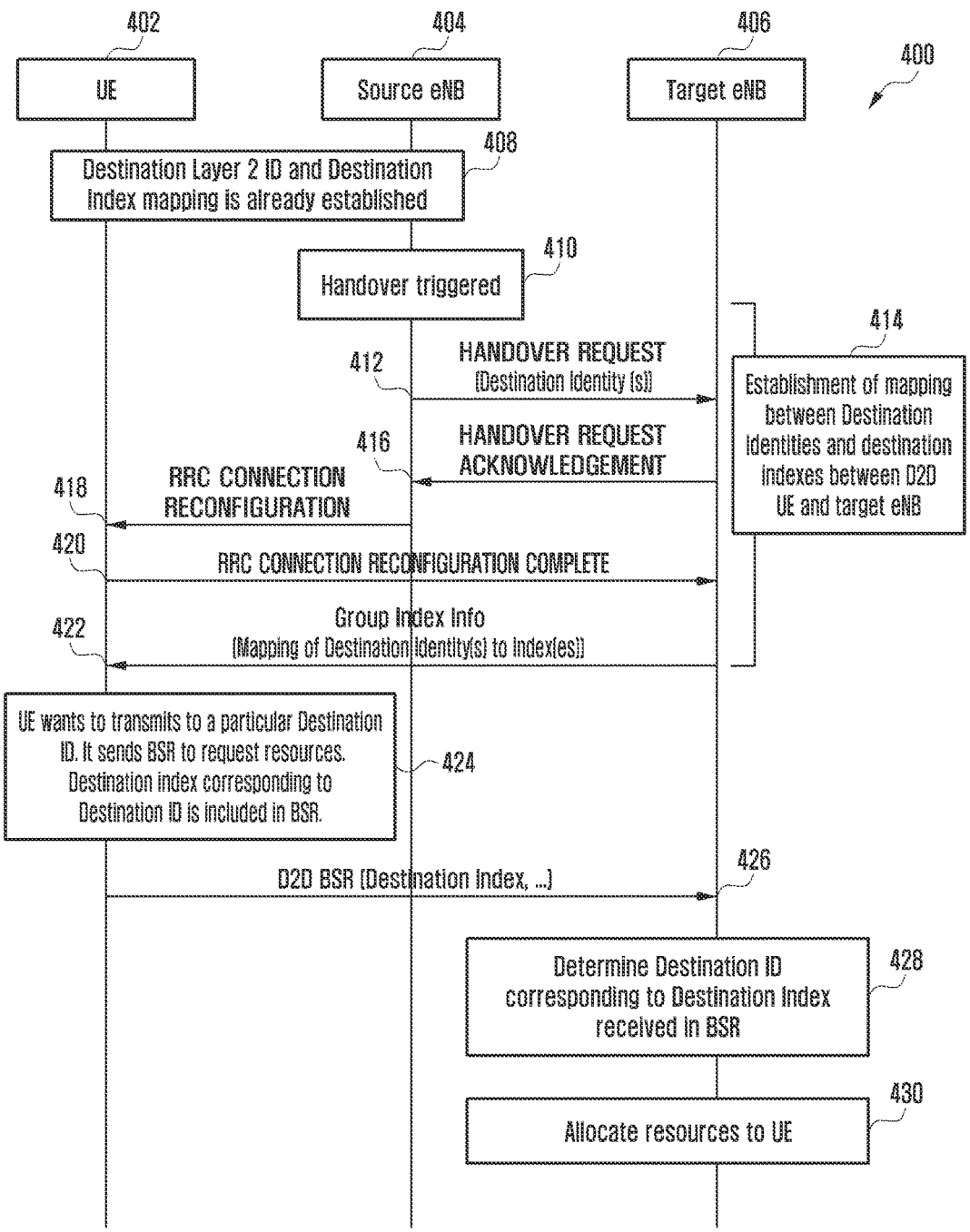

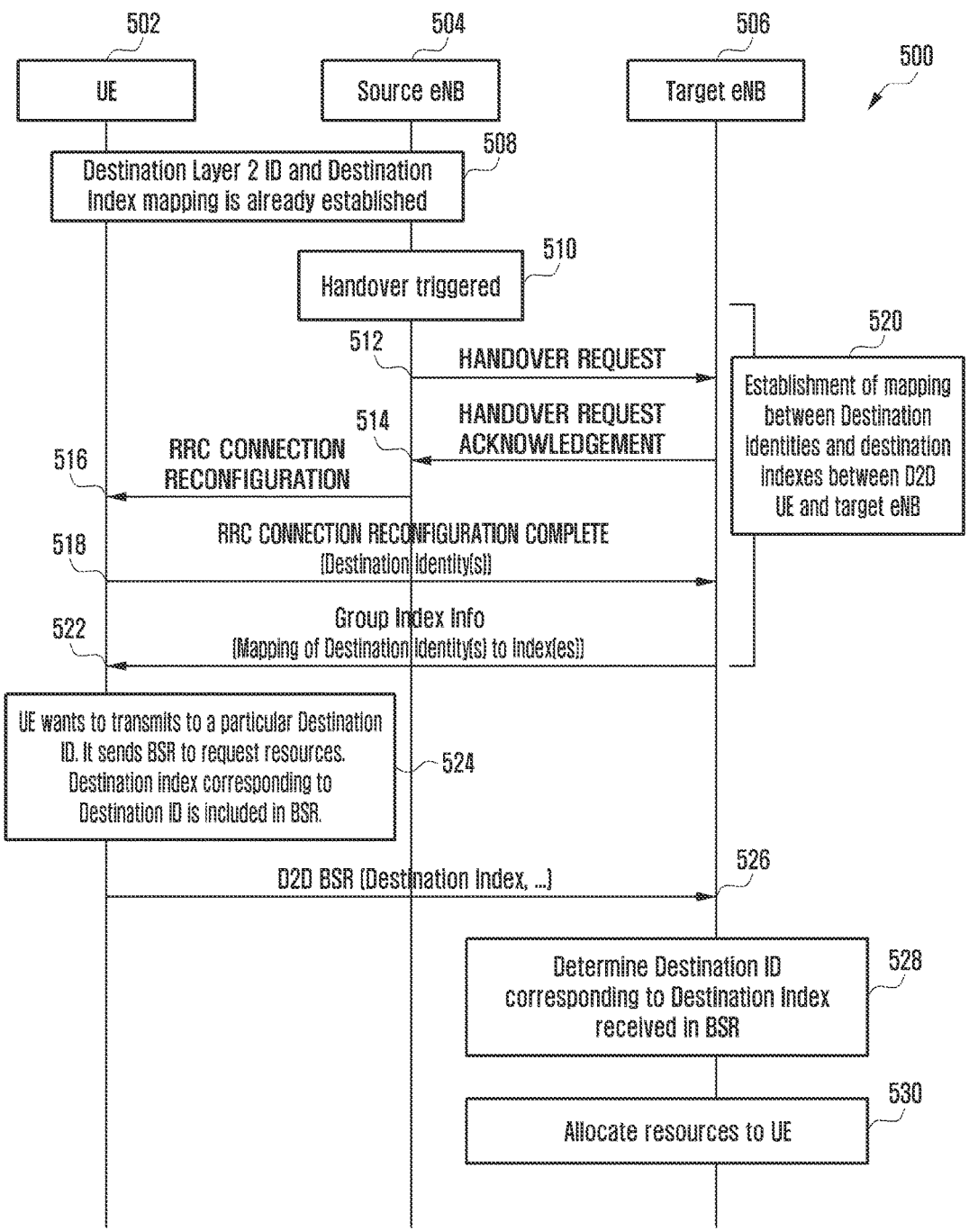

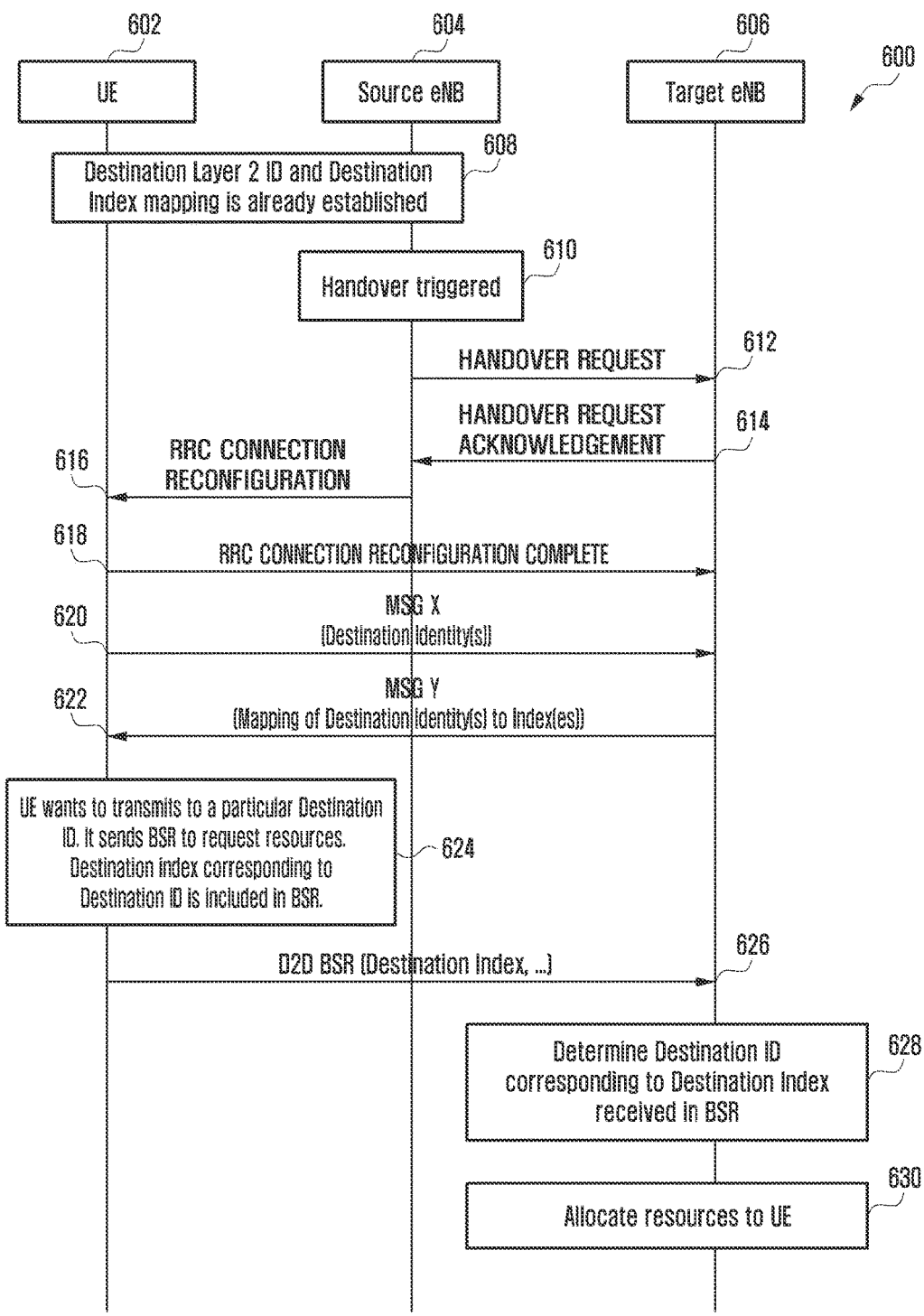

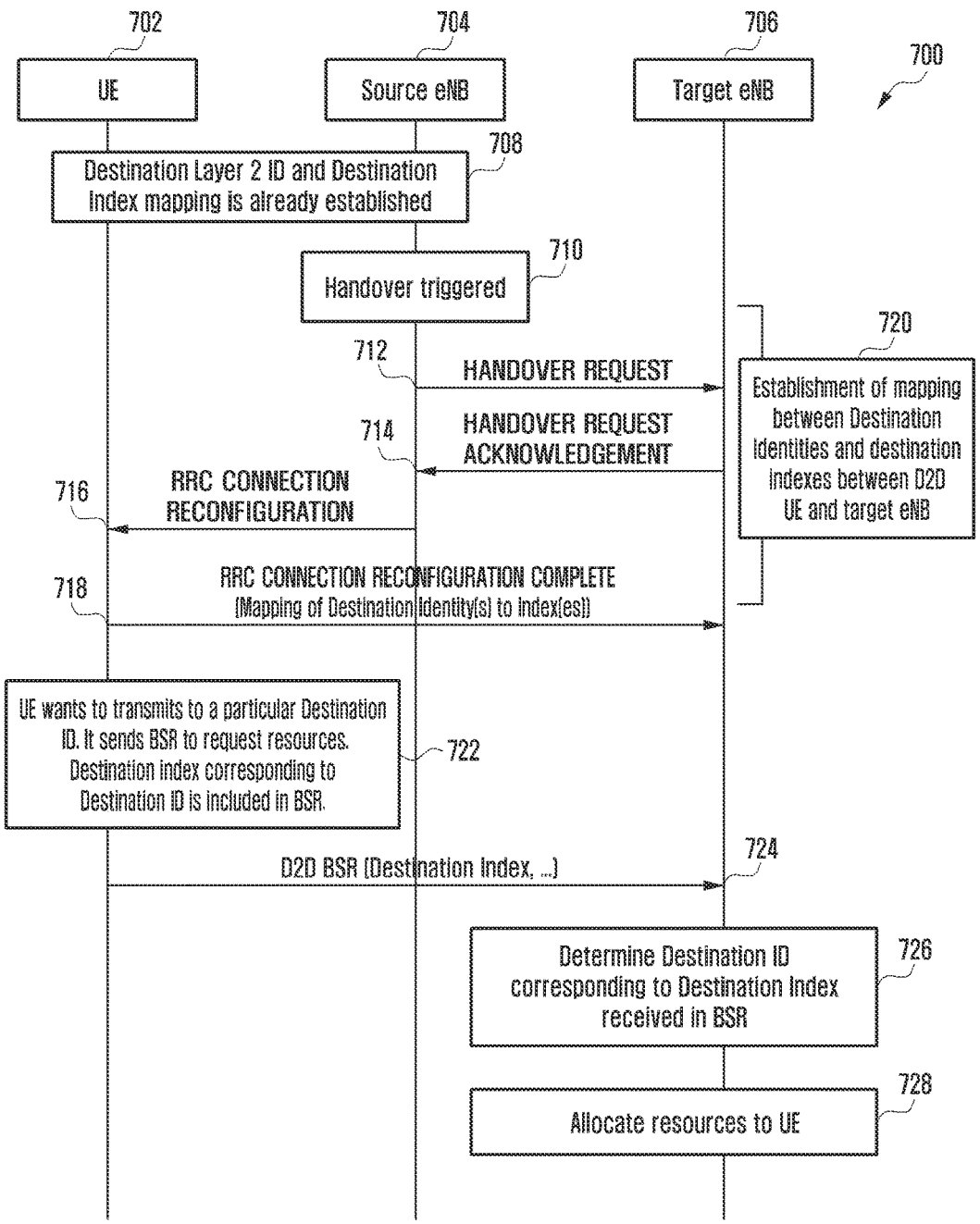

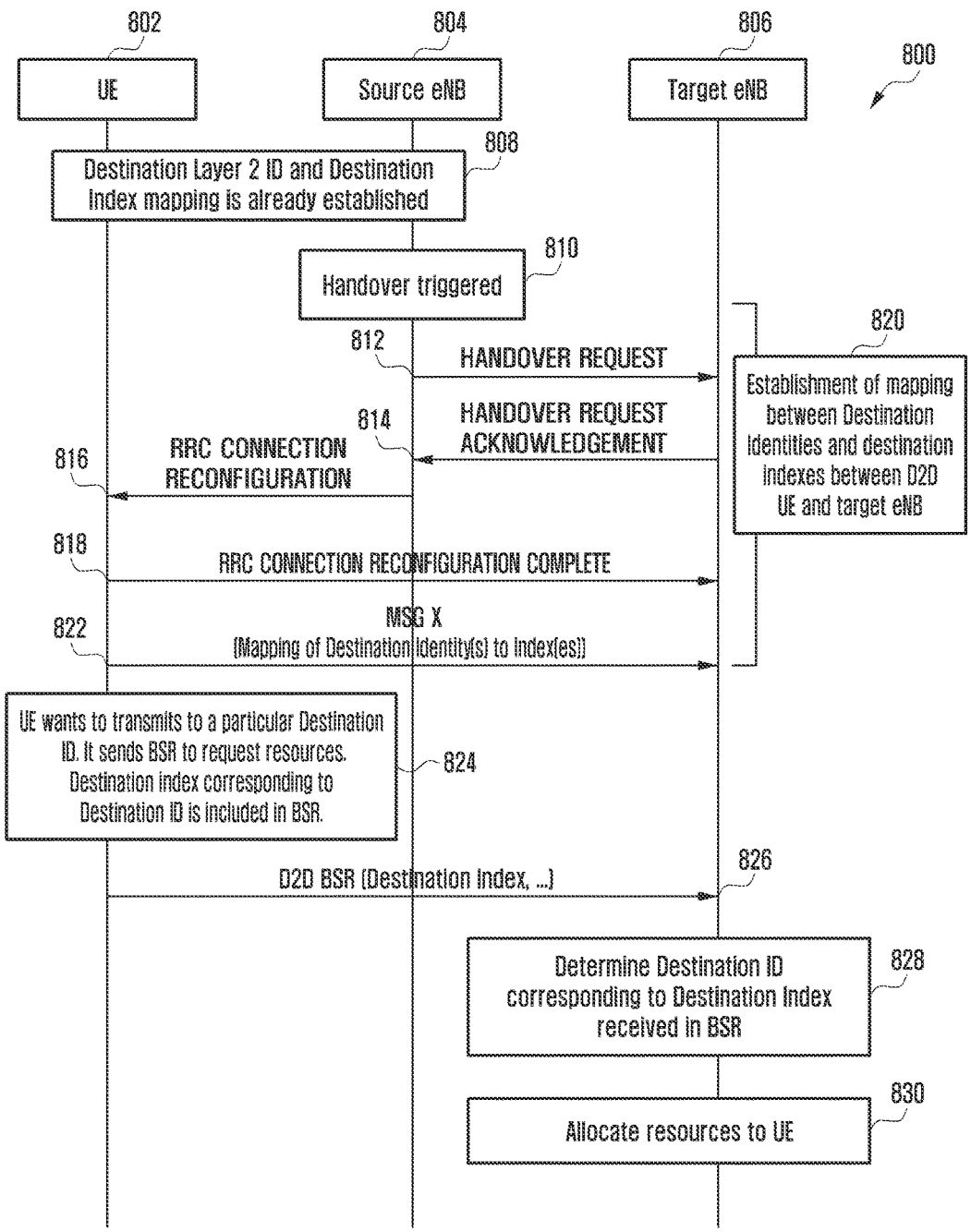

METHOD AND SYSTEM FOR HANDLING DEVICE TO DEVICE (D2D) COMMUNICATION

CROSS-REFERENCE TO RELATED APPLICATION(S)

This application claims the benefit under 35 U.S.C. 119(a) of an Indian Provisional application filed on Oct. 17, 2014 in the Indian Patent Office and assigned Serial number 5200/CHE/2014, and of an Indian Non-Provisional patent application filed on Jul. 2, 2015 in the Indian Patent Office and assigned Serial number 5200/CHE/2014, the entire disclosure of each of which is hereby incorporated by reference.

TECHNICAL FIELD

The present disclosure relates to wireless communication. More particularly, the present disclosure relates to a method and system for handling device-to-device (D2D) communication; and more particularly relates to reducing buffer status report (BSR) overhead in D2D communication.

BACKGROUND

Device to device (D2D) communication is being studied in communication standard groups to enable data communication services between user equipments (UEs). During the D2D communication, a transmitting D2D UE can transmit data packets to a group of D2D UEs or broadcast control/data packets to all the D2D UEs or send unicast control/data packets to a specific D2D UE. D2D communication between the transmitter UE and receiver UEs is connectionless in nature, i.e., neither connection setup nor control messages are exchanged between the transmitter UE and the receiver UEs before the transmitter UE starts transmitting the control/data packets. During the transmission, the transmitter UE includes the source identity (ID) and the destination ID in the data packets. The source ID is set to the UE ID of the transmitter, while the destination ID is the intended recipient of the transmitted packet. The destination ID indicates whether the packet is a broadcast packet or a unicast packet or a packet intended for a group.

For group cast communication, the D2D UE can be member of one or more groups. In order to obtain resources for transmitting, the D2D UE sends the buffer status report (BSR) to an evolved node b (eNodeB) (or simply eNB or base station), wherein the Buffer status report (BSR) indicates the buffer size and D2D Layer 2 Group Identity. The eNodeB allocates resources to D2D UE based on the received BSR. The D2D Layer 2 Group ID in the BSR can be used by the eNodeB to provide resources to D2D UE from the resource pool corresponding to the group identified by D2D Layer 2 Group ID. The D2D Layer 2 Group ID in the BSR can also be used by the eNodeB to identify multiple transmissions to the same group by different D2D UEs and then the eNodeB can allocate distinct resources in the time domain to those D2D UEs. For example, D2D UE 1 sends BSR1 with D2D Layer 2 Group ID 1, D2D UE 2 sends BSR 2 with D2D Layer 2 Group ID 1. Since the resources requested by D2D UE1 and D2D UE2 are for the transmission to the same group, the eNodeB allocates separate resources in the time domain to both the D2D UE1 and the D2D UE2. Since D2D communication is half duplex, allocating separate resources in the time domain to D2D UE 1 and D2D UE2 will allow the D2D UE1 and D2D UE2 to receive each other's transmission.

Further, each group is assigned with a D2D Layer 2 Group ID with a size of 24 bits or 48 bits. Sending the D2D Layer 2 Group ID in BSR increases the BSR overhead significantly.

In view of the foregoing, there exists a need to provide a method and system to reduce the signaling overhead of sending the D2D Layer 2 Group ID during D2D communication.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for reducing signaling overhead in device-to-device (D2D) communication.

In accordance with an aspect of the present disclosure, a method for a user equipment (UE) to reduce signaling overhead in D2D communication is provided. The method includes a list of one or more destination identities (IDs) to an evolved node b (eNodeB) (or simply eNB or base station) in a signaling message, wherein one or more destination IDs in the list identifies corresponding one or more destination devices with which the UE intends to communicate, and transmitting, a destination index in a buffer status report (BSR) to the eNodeB to request dedicated resources for transmitting D2D communication packets to the one or more destination devices, wherein destination index is the index of destination ID corresponding to the one or more destination devices in the list of one or more destination IDs transmitted in the signaling message to the eNodeB.

In an embodiment of the present disclosure, the destination ID can be at least one of D2D group ID related to a D2D group, a D2D broadcast ID, and a D2D unicast ID corresponding to the ID of the destination UE. In an embodiment of the present disclosure, the signaling message comprising of a list of one or more destination IDs is transmitted to eNodeB whenever there is a change in list of destination IDs with which the said UE wants to communicate.

In an embodiment of the present disclosure, the signaling message comprising of a list of one or more destination IDs is transmitted by UE to target eNodeB after handover if the UE has transmitted the said signaling message during the last 1 second preceding reception of the handover command from source eNodeB.

In accordance with an aspect of the present disclosure, a method for a base station (eNodeB) to reduce signaling overhead in D2D communication is provided. The method includes by an eNodeB, one or more destination identities, wherein each destination ID associated with one or more target UEs, creating, by the eNodeB, a mapping between the one or more destination IDs and one or more destination indexes corresponding to the one or more destination IDs, receiving, by the eNodeB from a source UE, a destination index in a BSR, wherein the destination index is represents an index of a destination ID in the list of destination IDs received, identifying the destination ID corresponding to the received destination index using the mapping, identifying one or more target UEs corresponding to the identified destination ID, and allocating resources to the source UE to communicate with the one or more identified target UEs.

In accordance with an aspect of the present disclosure, creating mapping between the one or more destination IDs and one or more destination indexes can further comprises identifying the destination index corresponding to each destination ID wherein the destination index is the index of destination ID in the list of destination IDs received by the eNodeB.

In accordance with an aspect of the present disclosure, the destination ID from the one or more destination identities is provided. The destination ID includes one of a D2D group ID related to a D2D group, a D2D broadcast ID, and a D2D unicast ID corresponding to the ID of a target device. In an embodiment of the present disclosure, the base station is a target base station and receives the list of one or more destination IDs from a source eNodeB in handover request message during handover.

In another embodiment of the present disclosure, the base station is the source base station and transmits the list of one or more destination IDs received from at least one of the UE and the source base station to the target base station during handover. In an embodiment of the present disclosure, allocates distinct resources in the time domain to the one or more UEs upon identifying that one or more UEs intend to communicate with the same destination device corresponding to which the eNodeB has determined destination ID. In an embodiment of the present disclosure, the eNodeB allocates distinct resources in the time domain to the one or more UEs upon identifying that one or more UEs intend to communicate with the same destination device corresponding to which the eNodeB has determined destination ID.

According to another embodiment of the present disclosure a system for reducing signaling overhead in D2D communication, the system comprises a UE adapted for transmitting, a list of one or more destination IDs to an eNodeB in a signaling message, wherein one or more destination IDs in the list identifies corresponding one or more destination devices with which the UE intends to communicate, and transmitting, a destination index in a BSR to the eNodeB to request dedicated resources for transmitting D2D communication packets to the one or more destination devices, wherein destination index is the index of destination ID corresponding to the one or more destination devices in the list of one or more destination IDs transmitted in the signaling message to the eNodeB, and a base station adapted for receiving, by an eNodeB, one or more destination IDs, wherein each destination ID associated with one or more target UEs, creating, by the eNodeB, a mapping between the one or more destination IDs and one or more destination indexes corresponding to the one or more destination IDs, receiving, by the eNodeB from a source UE, a destination index in a BSR, wherein the destination index is represents an index of a destination ID in the list of destination IDs received, identifying the destination ID corresponding to the received destination index using the mapping, identifying one or more target UEs corresponding to the identified destination ID, and allocating resources to the source UE to communicate with the one or more identified target UEs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a schematic flow diagram illustrating a method for handling D2D communication during handover of D2D UE from the source eNodeB to the destination eNodeB according to an embodiment of the present disclosure.

FIG. 5 is a schematic flow diagram illustrating a method for handling D2D communication during handover of D2D UE from the source eNodeB to the destination eNodeB according to an embodiment of the present disclosure.

FIG. 6 is a schematic flow diagram illustrating a method for handling D2D communication during handover of D2D UE from the source eNodeB to the destination eNodeB according to an embodiment of the present disclosure.

FIG. 7 is a schematic flow diagram illustrating a method for handling D2D communication during handover of D2D UE from the source eNodeB to the destination eNodeB according to an embodiment of the present disclosure.

FIG. 8 is a schematic flow diagram illustrating a method for handling D2D communication during handover of D2D UE from the source eNodeB to the destination eNodeB according to an embodiment of the present disclosure.

Throughout the drawings, like reference numerals will be understood to refer to like parts, components, and structures.

DETAILED DESCRIPTION

Figure 1:
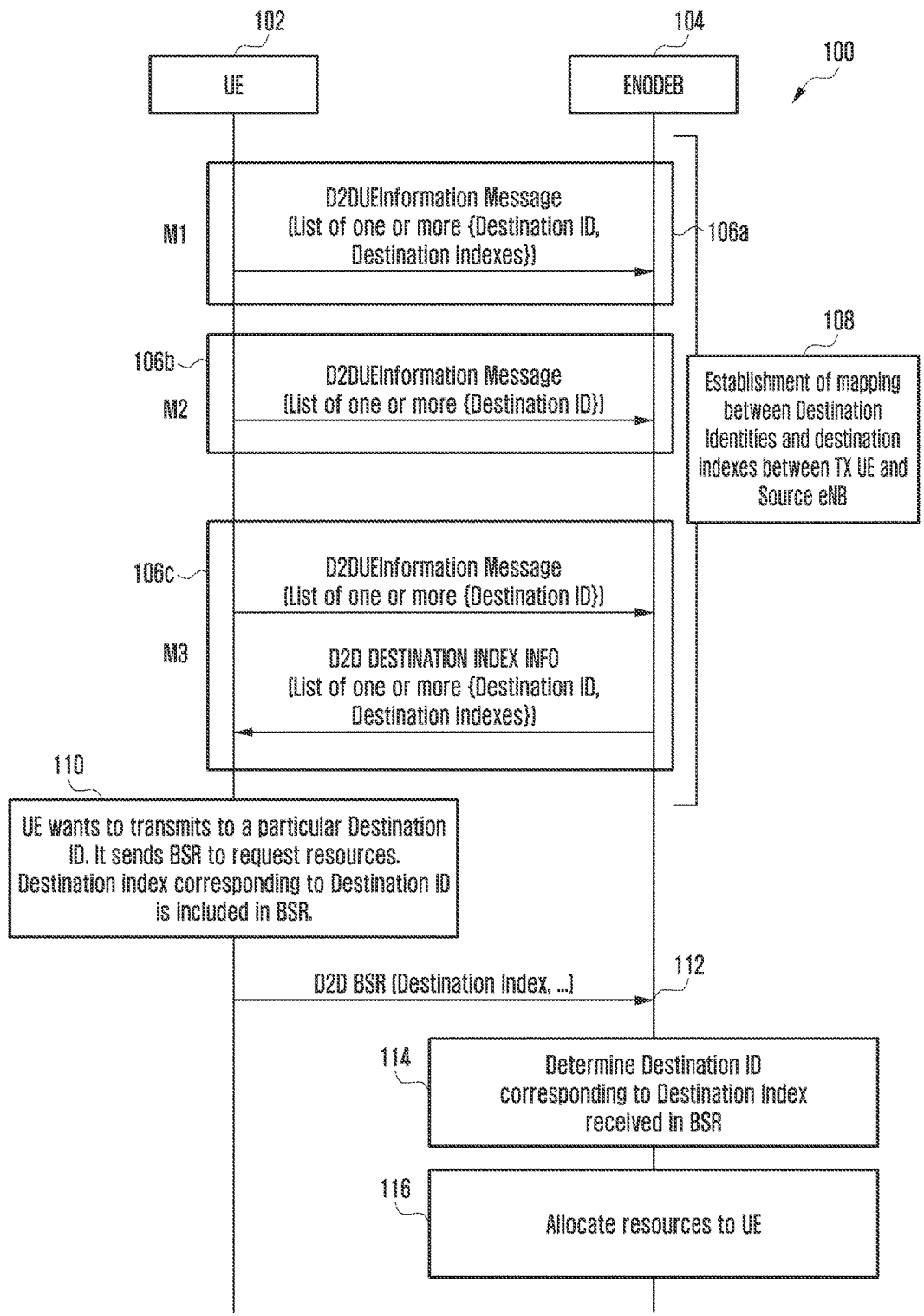
FIG. 1 is a schematic flow diagram illustrating a method for handling device to device (D2D) communication according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The specification may refer to "an", "one" or "some" embodiment(s) of the present disclosure in several locations. This does not necessarily imply that each such reference is to the same embodiment(s) of the present disclosure, or that the feature only applies to a single embodiment of the present disclosure. Single features of different various embodiments of the present disclosure may also be combined to provide other various embodiments of the present disclosure.

It will be further understood that the terms "includes", "comprises", "including" and/or "comprising" when used in this specification, specify the presence of stated features, integers, operations, elements and/or components, but do not preclude the presence or addition of one or more other features integers, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure provides for reducing overhead during device to device (D2D) communication by mapping destination identities (IDs) with destination indexes and allocating resources to user equipment (UE) based on the identified destination identity corresponding to the destination index. The present disclosure provides a method to establish mapping of the destination ID with destination index at D2D UE, source evolved node B (eNodeB) (or simply eNB or base station) and target eNodeB. The present disclosure discloses a method and system for handling D2D communication. Various embodiments of the present disclosure are described in the present disclosure to describe the operations of the method, but are not to limiting to the scope of the present disclosure.

The various embodiments of the present disclosure and the various features and advantageous details thereof are explained more fully with reference to the non-limiting various embodiments of the present disclosure that are illustrated in the accompanying drawings and detailed in the following description. Descriptions of well-known components and processing techniques are omitted so as to not unnecessarily obscure the various embodiments of the present disclosure. The examples used herein are intended merely to facilitate an understanding of ways in which the various embodiments of the present disclosure can be practiced and to further enable those of skill in the art to practice the various embodiments of the present disclosure. Accordingly, the examples should not be construed as limiting the scope of the various embodiments of the present disclosure.

According to an embodiment of the present disclosure, a method to reduce signaling overhead in D2D communication is disclosed. The method comprises a UE transmitting, a list of one or more destination IDs to eNodeB in a signaling message, wherein one or more destination IDs in the list identifies the one or more destinations with which the UE wants to communicate. For communicating with one or more UEs, be a group communication, broadcasting the message or one-to-one (unicast) communication, the UE requires resources from the eNodeB for transmitting the control packets and/or data packets. In an embodiment of the present disclosure, the destination ID or ID is at least one of a D2D group ID related to the D2D group to which the UE wants to transmit control/data packets, a D2D broadcast ID, and a D2D unicast ID that corresponds to the ID of the destination UE to which the UE wants to transmit control/data packets. In an embodiment of the present disclosure, the resources can include, but are not limited to, network bandwidth, one or more channels for transmitting the control/data packets, and the like. A person having ordinary skill in the art can understand that resources are provided by the base station or eNodeB for transmission of control/data packets to one or more other UEs without departing from the scope of the disclosure.

According to the present disclosure, the UE can transmit the list of one or more of the destination IDs corresponding to the destinations for which it wants to obtain dedicated resources from the eNodeB. In an embodiment of the present disclosure, a destination index corresponding to each of the destination IDs may also be transmitted by the UE to the eNodeB. The UE transmits the list of destination IDs to the eNodeB for which it requests the eNodeB to assign dedicated resources. Here the destination ID can be a destination layer 2 ID of the destination, and the destination index can be an index value assigned to the destination ID transmitted to eNodeB for indexing and identifying. The destination ID can be of length varying from 24 bits to 48 bits and the destination index can be a length of 4 bits.

In an embodiment of the present disclosure, D2DUE information message, comprising the destination ID, can be transmitted from the UE to the eNodeB. In an embodiment of the present disclosure, the D2DUE information can also comprise a destination index corresponding to each destination ID. The destination index is assigned only to the destination ID transmitted to the eNodeB in the D2DUEinformation message. One destination ID can be assigned with only one destination index, and thus the destination ID can be easily obtained for the particular destination index. The destination indexing leads to reduced signaling overhead in a buffer status report (BSR) as the number of destinations which are indexed are much smaller in number compared to actual number of destinations. It is to be noted that for a 24 bit destination ID, the UE does not communicate with all $2^{24}$ destinations. The UE may be communicating with very few destinations and only these are indexed and sent in D2DUE information message.

In an embodiment of the present disclosure, the UE can generate a list of destination identities, wherein each of the destination IDs is associated with the corresponding destination index. In an embodiment of the present disclosure, the UE can generate a list of destination indexes for the list of destination IDs and transmit both the list of destination IDs and the destination indexes to the eNodeB in a D2DUEInformation message. In an embodiment of the present disclosure, the UE can transmit only the list of destination IDs in a D2DUEInformation message, wherein the eNodeB can consider the order in which the destination IDs are received itself is the destination indexes for the destination identities. For example, the UE may be interested in transmitting to destination ID X, destination ID Y, and destination ID Z. The UE can send the list {destination ID X, destination ID Y, and destination ID Z} to the eNodeB. As the destination ID X is first in the list, the eNodeB considers that the destination index for the destination ID X is 0. The destination ID Y is second in the list, so the destination index for the destination ID Y is 1, and the destination ID Z is third in the list, so the destination index for the destination ID Z is 2. The starting number for the destination index can be varied based on the settings, and thus the person having ordinary skill in the art can understand that the order of the destination IDs received at the eNodeB will determine the destination indexes, without departing from the scope of the disclosure.

In an embodiment of the present disclosure, the UE can transmit the list of destination IDs to the eNodeB in the D2DUEInformation message. The eNodeB can receive the destination IDs and generate the destination indexes for the received destination IDs and transmit the generated list of the destination indexes and the corresponding destination IDs to the UE along with the D2D destination index info message. In an embodiment of the present disclosure, the list of both the destination IDs and the destination indexes can be stored at both the UE and the eNodeB. In an embodiment of the present disclosure, the list of both the destination IDs and the destination indexes can be stored in a local server, cloud, and the like, without departing from the scope of the disclosure.

In an embodiment of the present disclosure, the base station can be the source base station and transmits a list of one or more destination IDs received from at least one of UE and base station to target base station during handover.

Further, at the next operation, the method comprises the UE transmitting a destination index in a BSR to the eNodeB to request dedicated resources for transmitting D2D communication packets to a destination. In an embodiment of the present disclosure, destination index is the index of a destination ID corresponding to said destination in the list of destination IDs transmitted in a signaling message to the eNodeB. The destination index is the index of destination ID in the list of destination IDs reported to the eNodeB in D2DUEInformation message. In an embodiment of the present disclosure, destinationInfoList can be the list of destination IDs sent in D2DUEInformation Message to eNodeB. The length of destination index field can be 4 bits. The destination index in BSR is set to the index of the destination reported in destinationInfoList. In an embodiment of the present disclosure, destination index is the index of destination ID corresponding to the said destination in the list of destination IDs and destination indexes transmitted in a signaling message by the eNodeB.

According to an embodiment of the present disclosure D2DUEInformation message can be sent by the UE to the eNodeB whenever there is a change in list of destinations to which UE wants to communicate.

According to an embodiment of the present disclosure, a method to reduce signaling overhead in D2D communication, the method comprises an operation of the eNodeB receiving one or more destination identities, wherein each destination ID associated with one or more target UEs, wherein one or more destination IDs in the list identifies the one or more destinations with which the said UE wants to communicate. The UE which wishes to establish a D2D communication with one or more devices, either a D2D broadcast communication or a D2D unicast communication or a D2D group communication, can transmit a signaling message to the eNodeB requesting for resources for D2D communication. In an embodiment of the present disclosure, the signaling message can be D2DUE information message.

According to the present disclosure, the D2DUE information message can comprise a list of one or more destination IDs, wherein one or more destination IDs in the list identifies the one or more destinations with which the said UE wants to communicate. In an embodiment of the present disclosure, destination index associated with each of destination ID in the list one or more destination IDs may also be received by the eNodeB in D2DUE information message. In an embodiment of the present of the present disclosure, the eNodeB that receives the signaling message along with the list of destination IDs can be a source eNodeB from which the UE wishes to access resources. In an embodiment of the present disclosure, due to various reasons, such as, but not limited to, overloading of excess UEs requesting resources, lack of bandwidth, and the like, the source eNodeB can handover the UE to the another eNodeB, called as target eNodeB. The target eNodeB can receive the handover request from the source eNodeB along with the D2DUE information message and the list of destination identities.

Further, the method comprises the operation of the eNodeB creating a mapping between the one or more destination IDs and one or more destination indexes corresponding to the one or more destination identities. Upon receiving the list of destination IDs, the eNodeB can establish mapping between the list of destination IDs and the destination indexes, wherein the established mapping can define the association between the destination IDs and the destination indexes. The association can allow the eNodeB and the UE to identify the destination ID based on the destination index. The eNodeB can store the mapping between the one or more destination IDs and one or more destination indexes for further reference, without departing from the scope of the disclosure. In an embodiment of the present disclosure, in order to create mapping between the one or more destination IDs and one or more destination indexes, eNodeB identifies the destination index corresponding to each destination ID wherein the destination index is the index of the destination ID in the list of destination IDs received by the eNodeB. In an embodiment of the present disclosure, in order to create mapping between the one or more destination IDs and one or more destination indexes the eNodeB, upon receiving the list of destination IDs, generating the destination indexes for the received destination IDs and transmitting the generated list of the destination indexes and the corresponding destination IDs to the UE along with the D2D destination index info message.

In an embodiment of the present disclosure, creating mapping between the one or more destination IDs and one or more destination indexes can further comprise identifying the destination index corresponding to each destination ID wherein the destination index is the index of the destination ID in the list of destination IDs received by the eNodeB.

Further, the method comprises the operation of the eNodeB receiving the destination index in a BSR from the UE requesting dedicated resources for transmitting D2D communication packets to a destination. The UE wishes to transmit control/data packets to a particular destination with the destination ID, wherein the destination can be a broadcast, unicast or a group. The UE can send the BSR message to the eNodeB requesting to allocate resources. The UE can also include the destination index corresponding to the destination ID in the BSR message. The destination index is the index of destination ID in the list of destination IDs reported to eNodeB in D2DUEInformation message, wherein the index field identifies a destination. In an embodiment of the present disclosure, destinationInfoList can be the list of destination IDs sent in D2DUEInformation message to eNodeB. The length of destination index field can be 4 bits. The value is set to the index of the destination reported in destinationInfoList. In an embodiment of the present disclosure, the UE can transmit the BSR message to the eNodeB included with one or more destination indexes, with the intent of communicating with one or more destinations simultaneously, without departing from the scope of the disclosure.

Further, the method comprises the operation of the eNodeB identifying the destination ID corresponding to the received destination index using the mapping, wherein the determination is done using the list of one or more destination IDs received from at least one of UE and source base station wherein the destination index is the index of destination ID in the list of the destination IDs received. The eNodeB receives the BSR message from the UE and identifies the destination indexes included in the BSR message. The eNodeB identifies the individual destination indexes and determines the corresponding destination IDs from the stored list of destination IDs and destination indexes. The eNodeB can use matching of the destination indexes with the destination IDs to determine the destination identities.

Further, the method comprises the operation of identifying one or more target UEs corresponding to the identified destination ID. Further, the method comprises the operation of the eNodeB allocating resources to the UE based on the determined destination IDs received in the BSR. Upon determining the destination IDs included in the BSR message, the eNodeB identifies that the UE wishes to communicate with the destinations of which the destination IDs are identified. Based on the identified destination identities, the eNodeB can allocate the resources to the UE. As both the UE and eNodeB can transmit destination indexes of less size compared to destination IDs of large size for allocation of resources for D2D communication, the BSR can easily transmit the destination indexes, and thereby reduce overhead load in the BSR message.

In an embodiment of the present disclosure, the eNodeB can allocate distinct resources in the time domain to the one or more UEs upon identifying that one or more UEs intend to communicate with the same one or more target UEs corresponding to destination ID determined by the eNodeB.

FIG. 1 is a schematic flow diagram 100 illustrating a method for handling D2D communication according to an embodiment of the present disclosure. The flow diagram 100 depicts communication between a UE 102 and an eNodeB 104, wherein the UE 102 intends to communicate with one or more other UEs or destinations and thus requires resources to be allocated from the eNodeB 104. The flow diagram 100 depicts allocation of resources to the UE 102 from the eNodeB 104 with reduced overhead for reporting a destination ID in the BSR.

Referring to FIG. 1, the flow diagram 100, there are three ways to initiate the procedure. In an embodiment of the present disclosure, the UE 102 transmits a D2DUEInformation message 106*a* to the eNodeB 104, wherein the D2DUEInformation message 106*a* comprises a list of one or more of destination IDs and the destination indexes. The destination indexes mentioned in the D2DUEInformation message 106*a* are assigned to the destination IDs by the UE 102 itself.

In an embodiment of the present disclosure, the UE 102 transmits a D2DUEInformation message 106*b* to the eNodeB 104, wherein the D2DUEInformation message 106*b* includes list of one or more destination IDs corresponding to the destinations for which it wants to obtain dedicated resources from the eNodeB 104. The index or order of the destination ID in the list of destination IDs is the destination index corresponding to that destination ID. The eNodeB 104 can determine the destination index corresponding to each of the received destination ID, wherein the order or index in which the list of one or more destination IDs are received at the eNodeB 104 can be the destination index assigned by the eNodeB 104. For example, if the eNodeB 104 receives a list of destination IDs comprising of destination ID X, destination ID Y, and destination ID Z, then by default the eNodeB 104 can identify that the destination ID X is being assigned with destination index 0, the destination ID Y is being assigned with destination index 1, and the destination ID Z is being assigned with destination index 2. In an embodiment of the present disclosure, the order or index in which the list of one or more destination IDs are received at the eNodeB 104 can be the destination index assigned by the eNodeB 104, but the eNodeB 104 defines the starting random number with which the destination index should be initiated and the forthcoming numbers can be incremented by one to continue to sequence. For example, if the eNodeB 104 receives list of destination IDs comprising of destination ID X, destination ID Y, and destination ID Z, then by default the eNodeB 104 can specify that the starting destination index can be 1 and further can be incremented with 1, and therefore the destination ID X is being assigned with destination index 1, the destination ID Y is being assigned with destination index 2, and the destination ID Z is being assigned with destination index 3.

In an embodiment of the present disclosure, the UE 102 can transmit a D2DUEInformation message 106*c* to the eNodeB 104, wherein the D2DUEInformation message 106*c* comprises a list of destination identities. Upon receiving the destination identities, the eNodeB 104 can assign destination indexes to the received destination IDs and transmit back a D2D destination index info 106*d* message along with the list of destination IDs and the corresponding assigned destination indexes to the UE 102.

At operation 108, the eNodeB 104 and UE 102 can store a mapping established between the destination IDs and the destination indexes based on the one of the operations 106*a*, 106*b*, and 106*c* that can define the association between the two. The established mapping between the destination IDs and the destination indexes can be used during resource allocation.

At operation 110, the UE 102 wishes to communicate with one or more other UEs or destinations with particular destination IDs and thus requires resources to be allocated from the eNodeB 104. Therefore, the UE 102 can initiate including one or more destination indexes in the BSR corresponding to the one or more destination IDs with which the UE 102 wishes to communicate. At operation 112, the UE 102 can transmit the BSR included with list of one or more destination indexes to the eNodeB 104.

At operation 114, the eNodeB 104 can determine the destination ID corresponding to the destination index based on the mapping established during the operation 108 using one of the operations of 106*a*, 106*b*, and 106*c*. Upon determining the destination ID of the destination for which the UE 102 has sent the BSR, at operation 116, the eNodeB 104 can allocate resources to the UE 102 for transmitting control/data packets for D2D communication.

The destination ID identified from the BSR can be used by the eNodeB 104 to provide resources to UE 102 from the resource pool corresponding to the destination identified by destination ID. The destination ID can also be used by the eNodeB 104 to identify multiple transmissions to the same destination by different UEs and then eNodeB 104 can allocate distinct resources in the time domain to those D2D UEs.

The mapping of destination IDs with the destination indexes can be done in various other ways, without departing from the scope of the disclosure. The following herein mentioned various embodiments of the present disclosure can describe various embodiments of the present disclosure that depict the method for handling D2D communication with reduced overhead in the connection establishment.

The D2DUEInformation message can be sent by the UE 102 to eNodeB 104 whenever there is a change in list of destinations to which UE wants to communicate.

Figure 2:
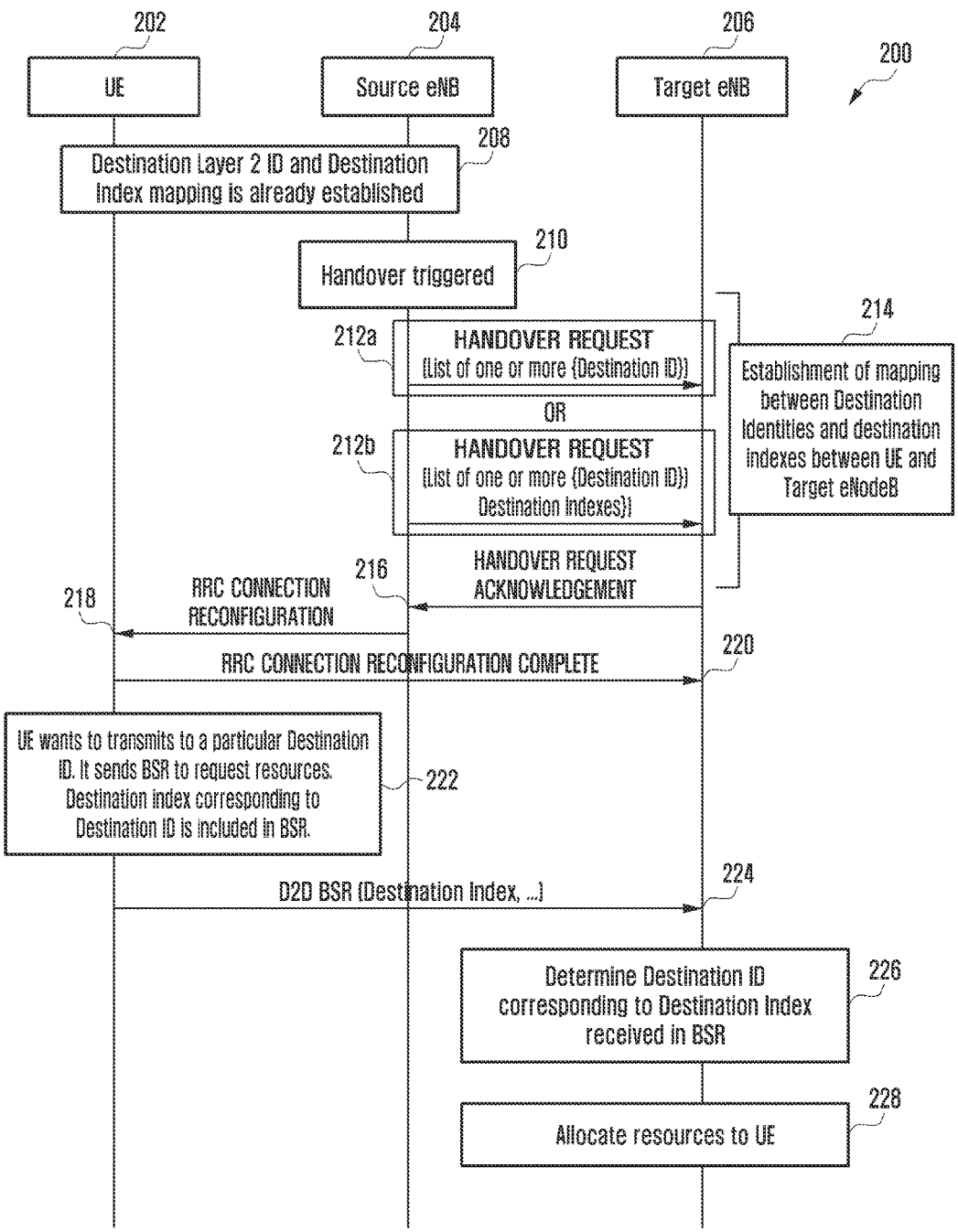
FIG. 2 is a schematic flow diagram illustrating a method for handling D2D communication during handover of D2D user equipment (UE) from a source evolved node b (eNodeB) (or simply eNB or base station) to a destination eNodeB according to an embodiment of the present disclosure.

FIG. 2 is a schematic flow diagram 200 illustrating a method for handling device to device D2D communication during handover of D2D UE from one eNodeB to the other according to an embodiment of the present disclosure.

Referring to FIG. 2, the flow diagram 200 of illustrates how a source eNodeB 204 assist target eNodeB 206 in establishing the mapping between destination ID and destination index when source eNodeB 204 handovers the UE 202 to a target eNodeB 206. The present flow diagram depicts communication between a UE 202, the source eNodeB 204, which is the initial eNodeB with which the UE 202 establishes connection and the target eNodeB 206 to which the source eNodeB 204 handovers the UE 202. According to the flow diagram 200, at operation 208 a mapping between destination IDs and destination indexes of the UE 202 and the source eNodeB 204 can be established and stored, as per the flow diagram described in FIG. 1, and the operations for establishing mapping for the UE 202 and the source eNodeB 204 is not described herein again to avoid repetition.

Further, at operation 210, the method comprises the source eNodeB 204 triggering a handover such that the UE 202 can be handed over to another eNodeB. In an embodiment of the present disclosure, the source eNodeB 204 can trigger the handover based on, but not limited to, measurement report that indicates that the resources provided by the source eNodeB 204 are not sufficient, load balancing on the current eNodeB as the load handled by the source eNodeB 204 is more than the threshold capacity of the source eNodeB 204 and the like.

Further, there can be two embodiments of the present disclosure in the next operation, wherein at operation 212a, the source eNodeB 204 can transmit a handover request message to the target eNodeB 206, wherein the handover request message can comprise a list of one or more destination IDs which the source eNodeB 204 has received from the UE 202 in D2DUEInformation message. The index or order of the destination ID in the list of destination IDs is the destination index corresponding to that destination ID. The target eNodeB 206 can determine the destination index corresponding to each of the received destination ID wherein the order or index of the destination ID in the list of destination IDs received is the destination index. For example, if the eNodeB 206 receives list of destination IDs comprising of destination ID X, destination ID Y, and destination ID Z, then by default the eNodeB 104 can identify that the destination ID X is being assigned with destination index 0, the destination ID Y is being assigned with destination index 1, and the destination ID Z is being assigned with destination index 2.

In an embodiment of the present disclosure, at operation 212b, the source eNodeB 204 can transmit a handover request message to the target eNodeB 206, wherein the handover request message can comprise a list of one or more destination IDs and corresponding destination indexes.

Further, at operation 214, the target eNodeB 206 can store a mapping established between the destination IDs and the destination indexes based on the one of the operations 212a and 212b that can define the association between the two. At operation 216, the target eNodeB 206 can transmit a handover request acknowledgement message back to the source eNodeB 204 indicating that it has received the handover request from the source eNodeB 204 and is ready to handle D2D communication of the UE 202. At operation 218, the source eNodeB 204 can transmit a radio resource control (RRC) connection reconfiguration message (i.e., handover command) to the UE 202 indicating that the UE 202 can configure its connection with the target eNodeB 206 for further D2D communication handling.

At operation 220, the UE 202 can transmit a RRC connection reconfiguration complete message to the target eNodeB indicating that the UE 202 has configured RRC connection with the target eNodeB 206 from source eNodeB 204 and is ready for communication with the target eNodeB 206.

It is possible that the UE 102 may have sent a D2D UE information message to the source eNodeB after the source eNodeB has sent a handover request message to the target eNodeB and hence the target eNodeB will not get updated information from the source eNodeB. So, in an embodiment of the present disclosure, if the UE 202 has transmitted an D2D UE information message during the last 1 second preceding reception of the RRCConnectionReconfiguration message (i.e., handover command) at operation 218, then the UE sends the D2D UE information message with a list of destination IDs to the target eNodeB after operation 220 and mapping between UE 102 and target eNodeB 204 is established using operations similar to 106 of FIG. 1.

Further, at operation 222, the UE 202 wishes to communicate with one or more other UEs or destinations with particular destination IDs and thus requires resources to be allocated from the target eNodeB 204. Therefore, the UE 202 can initiate including the destination indexes in the BSR corresponding to the respective destination IDs with which the UE 202 wishes to communicate. At operation 224, the UE 202 can transmit the BSR included with list of one or more destination indexes to the target eNodeB 206.

At operation 226, the target eNodeB 206 can determine the destination ID corresponding to the destination index based on the mapping established during the operation 214 using one of the operations of 212a and 212b. Upon determining the destination IDs of the destinations with which the UE 202 wishes to establish communication, at operation 228, the target eNodeB 206 can allocate resources to the UE 202 for establishing communication with the destinations, wherein the target eNodeB 206 identifies the destination IDs based on the received destination indexes and thereby reduces overhead on the BSR message. The advantage of this method is that UE 202 does not have to transmit D2DUEinformation message after handover to establish mapping between destination ID and destination indexes at target eNodeB. This reduces signaling overhead.

Figure 3:
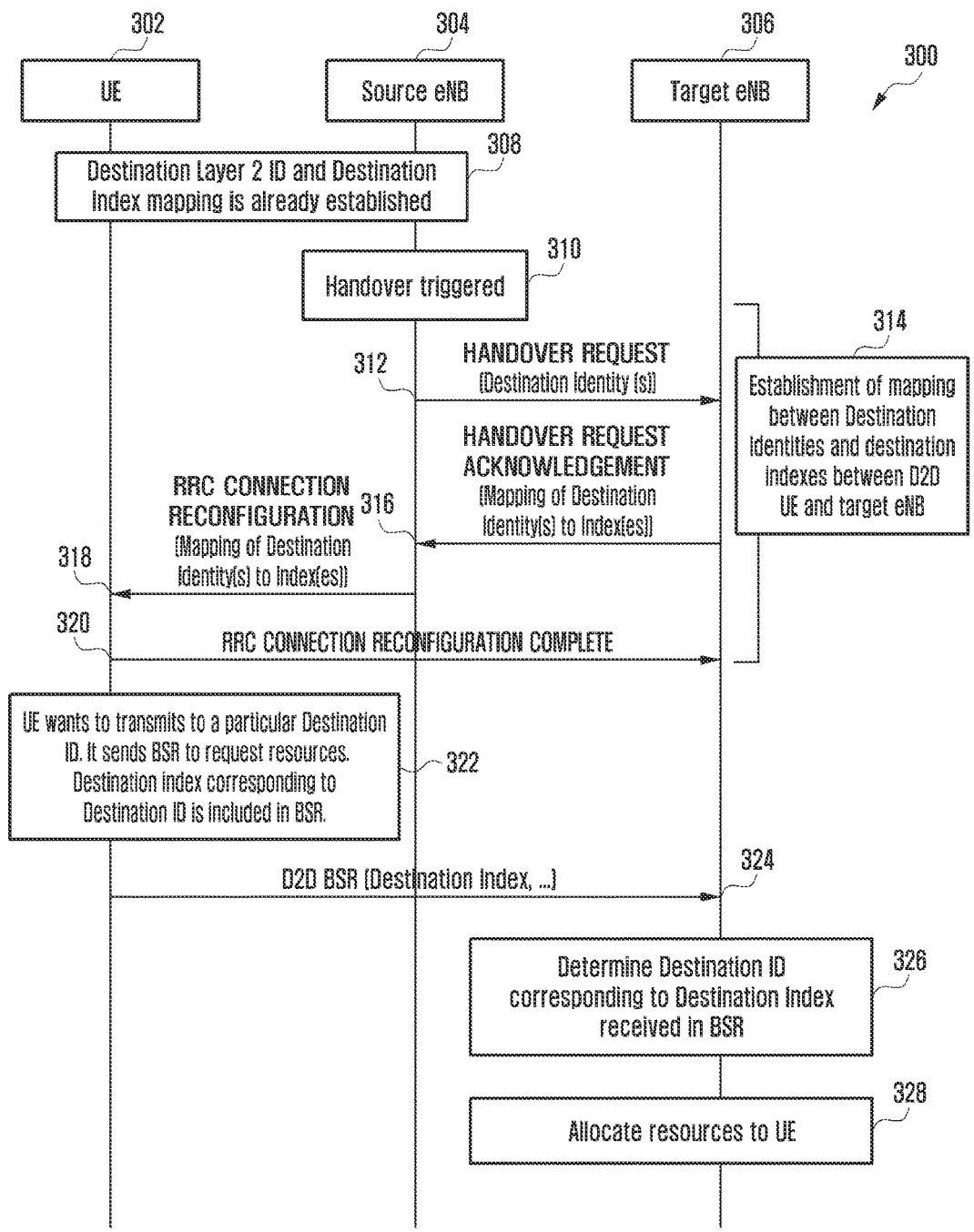
FIG. 3 is a schematic flow diagram illustrating a method for handling D2D communication during handover of D2D UE from a source eNodeB to a destination eNodeB according to an embodiment of the present disclosure.

FIG. 3 is a schematic flow diagram 300 illustrating a method for handling device to device D2D communication during handover of UE from one eNodeB to the other according to an embodiment of the present disclosure.

Referring to FIG. 3, the flow diagram 300 illustrates how a source eNodeB 304 assist the target eNodeB 306 in establishing the mapping between the destination ID and the destination index when the source eNodeB handovers the UE to a target eNodeB 306. The present flow diagram depicts communication between a UE 302, the source eNodeB 304, which is the initial eNodeB with which the UE 302 establishes connection and the target eNodeB 306 to which the source eNodeB 304 handovers the UE 302. According to the flow diagram 300, at operation 308 a mapping between destination IDs and destination indexes of the UE 302 and the source eNodeB 304 can be established, as per the flow diagram described in FIG. 1, and the operations for establishing mapping for the UE 302 and the source eNodeB 304 is not described herein again to avoid repetition.

Further, at operation 310, the method comprises the source eNodeB 304 triggering a handover such that the UE 302 can be handed over to another eNodeB, as described in FIG. 2, and therefore is not described herein again to avoid repetition. Further, at operation 312, the source eNodeB 304 can transmit a handover request message to the target eNodeB 306, wherein the handover request message can comprise a list of one or more destination IDs which the source eNodeB 304 has received from the UE 202 in D2DUEInformation message.

Further, at operation 314, the target eNodeB 306 can store a mapping established between the destination IDs and the destination indexes based on the operation 312 that can define the association between the two.

At operation 316, the target eNodeB 306 can transmit a handover request acknowledgement message back to the source eNodeB 304 along with the mapping of the destination IDs and the destination indexes. At operation 318, the source eNodeB 304 can transmit a RRC connection reconfiguration message to the UE 302 indicating the new mapping of the destination IDs and the destination indexes received from the target eNodeB 306 which the UE should use with target eNodeB 306.

At operation 320, the UE 302 can transmit a RRC connection reconfiguration complete message to the target eNodeB indicating that the UE 302 has configured RRC connection with the target eNodeB 306 from source eNodeB 304 and is ready for communication with the target eNodeB 306. Further, at operation 322, the UE 302 wishes to communicate with one or more other UEs or destinations with particular destination IDs and thus requires resources to be allocated from the target eNodeB 306. Therefore, the UE 302 can initiate including the one or more destination indexes in the BSR corresponding to the respective destination IDs with which the UE 302 wishes to communicate. At operation 324, the UE 302 can transmit the BSR included with list of one or more destination indexes to the target eNodeB 306.

At operation 326, the target eNodeB 306 can determine the destination ID corresponding to the destination index based on the mapping established during the operation 314 using the operation 312. Upon determining the destination IDs of the destinations with which the UE 302 wishes to establish communication, at operation 328, the target eNodeB 306 can allocate resources to the UE 302 for establishing communication with the destinations, wherein the target eNodeB 306 identifies the destination IDs based on the received destination indexes and thereby reduces overhead on the BSR message.

The advantage of this method is that UE 302 and eNodeB 306 does not have to exchange signaling messages after handover to establish mapping between destination ID and destination indexes. This reduces signaling overhead.

FIG. 4 is a schematic flow diagram 400 illustrating a method for handling device to device D2D communication during handover of UE from one eNodeB to the other according to an embodiment of the present disclosure.

Referring to FIG. 4, the flow diagram 400 illustrates how a source eNodeB 404 assists target eNodeB 406 in establishing the mapping between destination ID and destination index when source eNodeB 404 handovers the UE 402 to a target eNodeB 406. The present flow diagram 400 depicts communication between a UE 402, the source eNodeB 404, which is the initial eNodeB with which the UE 402 establishes connection, and the target eNodeB 406 to which the source eNodeB 404 handovers the UE 402. According to the flow diagram 400, at operation 408 a mapping between destination IDs and destination indexes of the UE 402 and the source eNodeB 404 can be established, as per the flow diagram described in FIG. 1, and the operations for establishing mapping for the UE 402 and the source eNodeB 404 is not described herein again to avoid repetition.

Further, at operation 410, the method comprises the source eNodeB 404 triggering a handover such that the UE 402 can be handed over to another eNodeB, as described in the FIG. 2, and therefore not described herein again to avoid repetition. Further, at operation 412, the source eNodeB 404 can transmit a handover request message to the target eNodeB 406, wherein the handover request message can comprise a list of one or more destination IDs, which the source eNodeB 404 has received from the UE 402 in D2DUEInformation message.

Further, at operation 414, the target eNodeB 406 can store a mapping established between the destination IDs and the destination indexes based on the operation 412 that can define the association between the two. At operation 416, the target eNodeB 406 can transmit a handover request acknowledgement message back to the source eNodeB 404. At operation 418, the source eNodeB 404 can transmit a RRC connection reconfiguration message to the UE 402 which the UE 402 can use with target eNodeB 306.

At operation 420, the UE 402 can transmit a RRC connection reconfiguration complete message to the target eNodeB indicating that the UE 402 has configured RRC connection with the target eNodeB 406 from source eNodeB 404 and is ready for communication with the target eNodeB 406. Further, at operation 422, the target eNodeB 406 can transmit a group index information message, wherein the group index information message comprises the mapping of the destination IDs to the destination indexes.

Further, at operation 424, the UE 402 communicates with one or more other UEs or destinations with particular destination IDs and thus requires resources to be allocated from the target eNodeB 406. Therefore, the UE 402 can initiate including the one or more destination indexes in the BSR corresponding to the respective destination IDs with which the UE 402 wishes to communicate. At operation 426, the UE 402 can transmit the BSR included with list of one or more destination indexes to the target eNodeB 406.

At operation 428, the target eNodeB 406 can determine the destination ID corresponding to the destination index based on the mapping established during the operation 414 using the operation of 412. Upon determining the destination IDs of the destinations with which the UE 402 wishes to establish communication, at operation 430, the target eNodeB 406 can allocate resources to the UE 402 for establishing communication with the destinations, wherein the target eNodeB 406 identifies the destination IDs based on the received destination indexes and thereby reduces overhead on the BSR message.

FIG. 5 is a schematic flow diagram 500 illustrating a method for handling D2D communication during handover of UE from one eNodeB to the other according to an embodiment of the present disclosure.

Referring to FIG. 5, the flow diagram 500 illustrates how a source eNodeB 504 assists a target eNodeB 506 in establishing the mapping between destination ID and destination index when source eNodeB 504 handovers the UE 502 to the target eNodeB 506. The present flow diagram 500 depicts communication between a UE 502, the source eNodeB 504, which is the initial eNodeB with which the UE 502 establishes connection, and the target eNodeB 506 to which the source eNodeB 504 handovers the UE 502. According to the flow diagram 500, at operation 508 a mapping between destination IDs and destination indexes of the UE 502 and the source eNodeB 504 can be established, as per the flow diagram described in FIG. 1, and the operations for establishing mapping for the UE 502 and the source eNodeB 504 is not described herein again to avoid repetition.

Further, at operation 510, the method comprises the source eNodeB 504 triggering a handover such that the UE 502 can be handed over to another eNodeB, as described in the FIG. 2, and therefore not described herein again to avoid repetition. Further, at operation 512, the source eNodeB 504 can transmit a handover request message to the target eNodeB 506.

Further, at operation 514, the target eNodeB 506 can transmit a handover request acknowledgement message back to the source eNodeB 504. At operation 516, the source eNodeB 504 can transmit a RRC connection reconfiguration message to the UE 502 which the UE 502 can use with target eNodeB 506. Further at operation 518, UE 502 can transmit a RRC connection reconfiguration complete message along with the list of destination IDs to the target eNodeB 506 indicating that the UE 502 has configured RRC connection with the target eNodeB 506 from the source eNodeB 504 and is ready for communication with the target eNodeB 506. At operation 520, the target eNodeB 506 can store a mapping established between destination IDs and the destination indexes based on the operation 518 that can define the association between the two.

At operation 522, the target eNodeB 506 can transmit a group index information message, wherein the group index information message comprises the mapping of the destination IDs to the destination indexes. Further, at operation 524, the UE 502 wishes to communicate with one or more other UEs or destinations with particular destination IDs and thus requires resources to be allocated from the target eNodeB 506. Therefore, the UE 502 can initiate including the one or more destination indexes in the BSR corresponding to the respective destination IDs with which the UE 502 wishes to communicate. At operation 526, the UE 502 can transmit the BSR included with list of one or more destination indexes to the target eNodeB 506.

At operation 528, the target eNodeB 506 can determine the destination ID corresponding to the destination index based on the mapping established during the operation 520 using the operation 518. Upon determining the destination IDs of the destinations with which the UE 502 wishes to establish communication, at operation 530, the target eNodeB 506 can allocate resources to the UE 502 for establishing communication with the destinations, wherein the target eNodeB 506 identifies the destination IDs based on the received destination indexes and thereby reduces overhead on the BSR message.

FIG. 6 is a schematic flow diagram 600 illustrating a method for handling D2D communication during handover of UE from one eNodeB to the other according to an embodiment of the present disclosure.

Referring to FIG. 6, the flow diagram 600 illustrates how a source eNodeB 604 assists a target eNodeB 606 in establishing the mapping between destination ID and destination index when source eNodeB 604 handovers the UE 602 to the target eNodeB 606. The present flow diagram 600 depicts communication between a UE 602, the source eNodeB 604, which is the initial eNodeB with which the UE 602 establishes connection, and the target eNodeB 606 to which the source eNodeB 604 handovers the UE 602. According to the flow diagram 600, at operation 608 a mapping between destination IDs and destination indexes of the UE 602 and the source eNodeB 604 can be established, as per the flow diagram described in FIG. 1, and the operations for establishing mapping for the UE 602 and the source eNodeB 604 is not described herein again to avoid repetition.

Further, at operation 610, the method comprises the source eNodeB 604 triggering a handover such that the UE 602 can be handed over to another eNodeB, as described in the FIG. 2, and therefore not described herein again to avoid repetition. Further, at operation 612, the source eNodeB 604 can transmit a handover request message to the target eNodeB 606.

Further, at operation 614, the target eNodeB 606 can transmit a handover request acknowledgement message back to the source eNodeB 604. At operation 616, the source eNodeB 604 can transmit a RRC connection reconfiguration message to the UE 602 which the UE 502 can use with target eNodeB 506. Further at operation 618, UE 602 can transmit a RRC connection reconfiguration complete message to the target eNodeB 606 indicating that the UE 602 has configured RRC connection with the target eNodeB 606 from the source eNodeB 604 and is ready for communication with the target eNodeB 606. At operation 620, the UE 602 can transmit a message X along with along with the list of destination IDs to the target eNodeB 606. In an embodiment of the present disclosure, the message X can be any known interest indication message or a new message initiated by the UE 602 for communication with the target eNodeB 606, and the person having ordinary skill in the art can understand that any known message for initiating communication can be used as message X, without departing from the scope of the disclosure.

At operation 622, the target eNodeB 506 can store a mapping established between the destination IDs and the destination indexes based on the operation 620 that can define the association between the two. The target eNodeB 606 can transmit a message Y along with the mapping of the destination IDs to the destination indexes. In an embodiment of the present disclosure, the message Y can be any of the RRC connection reconfiguration message or a new message, and the person having ordinary skill in the art can understand that any known message can be used as message Y, without departing from the scope of the disclosure.

Further, at operation 624, the UE 602 wishes to communicate with one or more other UEs or destinations with particular destination IDs and thus requires resources to be allocated from the target eNodeB 606. Therefore, the UE 602 can initiate including the one or more destination indexes in the BSR corresponding to the respective destination IDs with which the UE 602 wishes to communicate. At operation 626, the UE 602 can transmit the BSR included with list of one or more destination indexes to the target eNodeB 606.

At operation 628, the target eNodeB 606 can determine the destination ID corresponding to the destination index based on the mapping established during the operation 622 using the operation 620. Upon determining the destination IDs of the destinations with which the UE 602 wishes to establish communication, at operation 630, the target eNodeB 606 can allocate resources to the UE 602 for establishing communication with the destinations, wherein the target eNodeB 606 identifies the destination IDs based on the received destination indexes and thereby reduces overhead on the BSR message.

FIG. 7 is a schematic flow diagram 700 illustrating a method for handling D2D communication during handover of UE from one eNodeB to the other according to an embodiment of the present disclosure.

Referring to FIG. 7, the flow diagram 700 illustrates how a source eNodeB 704 assists a target eNodeB 706 in establishing the mapping between destination ID and destination index when source eNodeB 704 handovers the UE 702 to a target eNodeB 706. The present flow diagram 700 depicts communication between a UE 702, the source eNodeB 704, which is the initial eNodeB with which the UE 702 establishes connection, and the target eNodeB 706 to which the source eNodeB 704 handovers the UE 702. According to the flow diagram 700, at operation 708 a mapping between destination IDs and destination indexes of the UE 702 and the source eNodeB 704 can be established, as per the flow diagram described in FIG. 1, and the operations for establishing mapping for the UE 702 and the source eNodeB 704 is not described herein again to avoid repetition.

Further, at operation 710, the method comprises the source eNodeB 704 triggering a handover such that the UE 702 can be handed over to another eNodeB, as described in the FIG. 2, and therefore not described herein again to avoid repetition. Further, at operation 712, the source eNodeB 704 can transmit a handover request message to the target eNodeB 706.

Further, at operation 714, the target eNodeB 706 can transmit a handover request acknowledgement message back to the source eNodeB 704. At operation 716, the source eNodeB 704 can transmit a RRC connection reconfiguration message to the UE 702 which the UE 702 can use with target eNodeB 706. Further at operation 718, UE 702 can transmit a RRC connection reconfiguration complete message to the target eNodeB 706 along with a mapping of destination IDs and corresponding destination indexes, indicating that the UE 702 has configured RRC connection with the target eNodeB 706 from the source eNodeB 704 and is ready for communication with the target eNodeB 706.

At operation 720, the target eNodeB 706 can store a mapping established between the destination IDs and the destination indexes based on the operation 718 that can define the association between the two. At operation 722, the UE 702 wishes to communicate with one or more other UEs or destinations with particular destination IDs and thus requires resources to be allocated from the target eNodeB 706. Therefore, the UE 702 can initiate including the one or more destination indexes in the BSR corresponding to the respective destination IDs with which the UE 702 wishes to communicate. At operation 724, the UE 702 can transmit the BSR included with list of one or more destination indexes to the target eNodeB 706.

At operation 726, the target eNodeB 706 can determine the destination ID corresponding to the destination index based on the mapping established during the operation 720 using the operation 718. Upon determining the destination IDs of the destinations with which the UE 702 wishes to establish communication, at operation 728, the target eNodeB 706 can allocate resources to the UE 702 for establishing communication with the destinations, wherein the target eNodeB 706 identifies the destination IDs based on the received destination indexes and thereby reduces overhead on the BSR message.

FIG. 8 is a schematic flow diagram 800 illustrating a method for handling D2D communication during handover of UE from one eNodeB to the other according to an embodiment of the present disclosure.

Referring to FIG. 8, the flow diagram 800 illustrates how a source eNodeB 804 assists a target eNodeB 806 in establishing the mapping between destination ID and destination index when source eNodeB 804 handovers the call to a target eNodeB 806. The present flow diagram 800 depicts communication between a UE 802, the source eNodeB 804, which is the initial eNodeB with which the UE 802 establishes connection, and the target eNodeB 806 to which the source eNodeB 804 handovers the UE 802. According to the flow diagram 800, at operation 808, a mapping between destination IDs and destination indexes of the UE 802 and the source eNodeB 804 can be established, as per the flow diagram described in FIG. 1, and the operations for establishing mapping for the UE 802 and the source eNodeB 804 is not described herein again to avoid repetition.

Further, at operation 810, the method comprises the source eNodeB 804 triggering a handover such that UE 802 can be handed over to another eNodeB, as described in the FIG. 2, and therefore not described herein again to avoid repetition. Further, at operation 812, the source eNodeB 804 can transmit a handover request message to the target eNodeB 806.

Further, at operation 814, the target eNodeB 806 can transmit a handover request acknowledgement message back to the source eNodeB 804. At operation 816, the source eNodeB 804 can transmit a RRC connection reconfiguration message to the UE 802 which the UE 802 can use with target eNodeB 806. Further at operation 818, UE 802 can transmit a RRC connection reconfiguration complete message to the target eNodeB 806 indicating that the UE 802 has configured RRC connection with the target eNodeB 806 from the source eNodeB 804 and is ready for communication with the target eNodeB 806.

At operation 820, the UE 802 can transmit message X along with a mapping of destination IDs and corresponding destination indexes to the target eNodeB 806. The message type of message X has been already describe herein above with respect to FIG. 6, and hence not described herein again to avoid repetition. At operation 822, the target eNodeB 806 can store a mapping established between the destination IDs and the destination indexes based on the operation 820 that can define the association between the two. At operation 824, the UE 802 wishes to communicate with one or more other UEs or destinations with particular destination IDs and thus requires resources to be allocated from the target eNodeB 806. Therefore, the UE 802 can initiate including the destination indexes in the BSR corresponding to the respective destination IDs with which the UE 802 wishes to communicate. At operation 826, the UE 802 can transmit the BSR included with list of one or more destination indexes to the target eNodeB 806.

At operation 828, the target eNodeB 806 can determine the destination ID corresponding to the destination index based on the mapping established during the operation 822 using the operation 820. Upon determining the destination IDs of the destinations with which the UE 802 wishes to establish communication, at operation 830, the target eNodeB 806 can allocate resources to the UE 802 for establishing communication with the destinations, wherein the target eNodeB 806 identifies the destination IDs based on the received destination indexes and thereby reduces overhead on the BSR message.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for reducing signaling overhead in device-to-device (D2D) communication by a terminal, the method comprising: transmitting, via radio resource control (RRC) signaling, a terminal information message including a destination information list, the destination information list including a plurality of destination identities for which the terminal requests to assign resources for D2D communication; transmitting, based on a buffer status report being triggered, the buffer status report, the buffer status report including an index indicating a destination identity in the destination information list, a length of the index being less than a length of the destination identity; and receiving resource allocation information based on the index, wherein the length of the index is 4 bits and the length of the destination identity is 24 bits.

2. The method of claim 1, wherein the transmitting of the buffer status report comprises:
identifying the destination identity for D2D communication among the plurality of the destination identities, based on the buffer status report being triggered;
determining the index of the destination identity based on the destination information list; and
transmitting the buffer status report including the index to the base station.

3. The method of claim 2,
wherein the terminal information message including the destination information list is transmitted from the base station to a target base station, based on a handover being triggered.

4. A method for reducing signaling overhead in device-to-device (D2D) communication by a base station, the method comprising: receiving, via radio resource control (RRC) signaling, a terminal information message including a destination information list from a terminal, the destination information list including a plurality of destination identities for which the terminal requests to assign resources for D2D communication; receiving, based on a buffer status report being triggered, the buffer status report, the buffer status report including an index indicating a destination identity in the destination information list, from the terminal, a length of the index being less than a length of the destination identity; and allocating resources to the terminal based on the index, wherein the length of the index is 4 bits and the length of the destination identity is 24 bits.

5. The method of claim 4,
wherein the destination identity for D2D communication is identified among the plurality of the destination identities, and
wherein the index of the destination identity is determined based on the destination information list.

6. The method of claim 5, further comprising:
transmitting the terminal information message to a target base station, based on a handover being triggered.

7. A terminal for reducing signaling overhead in device-to-device (D2D) communication, the terminal comprising:
a transceiver; and
at least one processor configured to:
transmit, via radio resource control (RRC) signaling, a terminal information message including a destination information list, the destination information list including a plurality of destination identities for which the terminal requests to assign resources for D2D communication,
transmit, based on a buffer status report being triggered, the buffer status report, the buffer status report including an index indicating a destination identity in the destination information list, a length of the index being less than a length of the destination identity, and
receive resource allocation information based on the index,
wherein the length of the index is 4 bits and the length of the destination identity is 24 bits.

8. The terminal of claim 7, wherein the at least one processor is further configured to:
identify the destination identity for D2D communication among the plurality of the destination identities, based on the buffer status report being triggered,
determine the index of the destination identity based on the destination information list, and
transmit the buffer status report including the index to the base station.

9. The terminal of claim 8,
wherein the terminal information message including the destination information list is transmitted from the base station to a target base station, based on a handover being triggered.

10. A base station for reducing signaling overhead in device-to-device (D2D) communication, the base station comprising:
a transceiver; and
at least one processor configured to:
receive, via radio resource control (RRC) signaling, a terminal information message including a destination information list from a terminal, the destination information list including a plurality of destination identities for which the terminal requests to assign resources for D2D communication,
receive, based on a buffer status report being triggered, the buffer status report, the buffer status report including an index indicating a destination identity in the destination information list, from the terminal, a length of the index being less than a length of the destination identity, and
allocate resources to the terminal based on the index,
wherein the length of the index is 4 bits and the length of the destination identity is 24 bits.

11. The base station of claim 10,
wherein the destination identity for D2D communication is identified among the plurality of the destination identities, and
wherein the index of the destination identity is determined based on the destination information list.

12. The base station of claim 11, wherein the at least one processor is further configured to transmit the terminal information message to a target base station, based on a handover being triggered.

* * * * *